Dec. 19, 1939.   E. P. HOEPFNER   2,184,044

FLOATING TRACTOR HITCH

Filed April 1, 1938

Inventor
Edward P. Hoepfner,
By William T. Geier
Attorney

Patented Dec. 19, 1939

2,184,044

UNITED STATES PATENT OFFICE 2,184,044

FLOATING TRACTOR HITCH

Edward P. Hoepfner, Roosevelt, Okla.

Application April 1, 1938, Serial No. 199,512

2 Claims. (Cl. 280—33.44)

This invention relates to a floating tractor hitch, and more particularly to a device for connecting a tractor to a farm implement, although such device is equally adapted for use with any other type of towable implement or vehicle.

In the tillage of the soil or the harvesting of crops by methods requiring the use of tractors, or the like, it has been found to be extremely difficult to work a considerable portion of the ground, particularly at the corners of the land and adjacent the boundaries thereof.

This difficulty has primarily arisen from the fact that the hitches in use at the present time do not permit of making sharp or acute turns. With such hitches any attempt to make other than a wide sweeping turn results in the towed implement assuming such an angular position with respect to the tractor and uneven distribution of the load that the power wheels thereof slip and skid thereby causing unnecessary wear and damage to the power mechanism.

Therefore, the primary important object of this invention is to provide a hitch of the above character which will insure efficient operation of the power mechanism and automatically function to equally distribute the load of the towed implement and to increase the traction of the rear wheels regardless of the angle of turning or the direction of travel of said power mechanism.

Another important object of this invention is to provide a hitch of the above character, which will entirely eliminate the tendency of the power wheels of the tractor to slip or skid when making sharp or acute turns so as to permit working of land, which has heretofore been extremely difficult with the devices at present in use.

Another important object of this invention is to provide a device of the above character which is of substantially universal application in that same can be readily used as a connection for implements or vehicles of various types and sizes without regard to the design thereof.

A further important object is to provide a device of the above character which is of simple construction easily manufactured, and one which may be placed upon the market at a reasonable cost.

Figure 1:
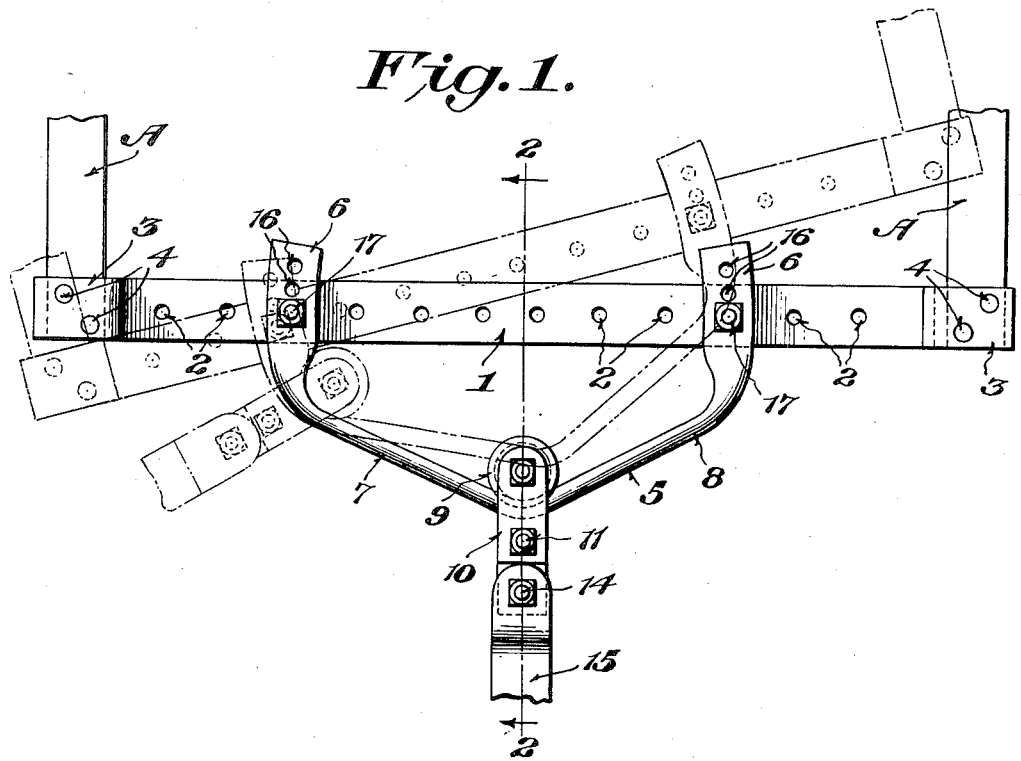
Figure 2:
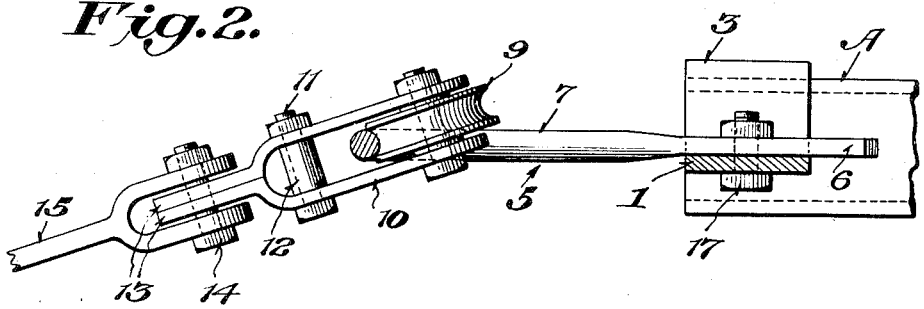

The foregoing and other objects and advantages will be readily apparent throughout the course of the following description and claims forming a part of this specification and the accompanying drawing, in which Figure 1 is a fragmentary top plan view of the hitch constituting my invention, connected to the rear portion of a tractor, and Figure 2 is a fragmentary sectional view taken on line 2—2 of Fig. 1.

Referring in detail to the drawing, A—A indicates generally the rear side portions of a tractor.

Disposed between the side portions A—A is a flat elongate supporting brace member 1 having uniformly spaced openings 2 therethrough.

The supporting brace 1 has each of its free ends 3 connected to an adjacent part of the tractor by removable fasteners 4 of any suitable character.

Mounted for predetermined adjustment longitudinally and transversely of the supporting brace 1, is a hitch bar generally designated 5, formed to provide arcuately curved flat ends 6, and it is to be particularly noted, an intermediate angularly bent bight portion of substantially V-formation, the arms 7 and 8 of which are circular in cross-section as shown in Fig. 2, and of continuously uniform diameter throughout their combined length. The arm 8 of the bight portion of the hitch is shorter than arm 7, so that an adjustment of substantially one-half the distance between the openings 2 in brace 1, may be obtained by inverting or reversing the hitch bar 5 thereon. It is also to be particularly noted that arms 7 and 8 of hitch bar 5 at their point of jointure together form a substantially obtuse angle with respect to each other to provide a centering part, but which part does not prevent free and unobstructed movement of roller 9 along the combined length of said arms.

Mounted for unobstructed movement along and circumferentially about the arms 7 and 8, is a grooved roller 9, anti-frictionally journaled between the free ends of similar sections of a clamp 10, and which sections thereof are secured together in predetermined spaced relation by means of a removable fastener 11 and spacer sleeve 12. The opposite contacting ends 13 of the clamp 10 are formed with alined openings for the reception of a bolt 14 forming a part of the usual implement draw-bar 15.

To provide for longitudinal and transverse adjustment of the hitch bar 5 on the supporting brace 1, each of the curved flat ends 6 thereof are provided with a curved series of spaced alined openings 16 each of which are adapted to register with cooperating openings 2 in brace 1 so as to receive a removable fastener element 17, whereby either end 6 of the hitch bar 5 may be swung transversely of the brace 1, about the axis of the opposite fastening element 17 to obtain a finer adjustment of the hitch if required, so as to compensate for side-draft encountered with some implements.

In operation when the tractor and implement are traveling in a straight line, the roller 9 and its supporting clamp 10 will automatically assume a central position as disclosed in full lines in Fig. 1. When the tractor is turned to the left and reaches its limit of turning movement as disclosed in dotted lines in Fig. 1 the roller 9 will automatically assume the dotted line position in Fig. 1.

From the foregoing it will be seen that during the turning movement the resistance of the load is applied at a point rearward and toward the inside driving wheel of the tractor, the shifting of the angle of pull on the implement thus easing the load on the tractor which thereby eliminates slippage or skidding and facilitates the turning movement of the tractor by permitting the outside wheel to run free as if no load was present. Thus it will be seen, the shifting of the roller during the turning movement tends to resist the forward progress of the inside wheel and thereby increases the power on the outside wheel during the turning movement of the tractor.

In order to compensate for the side-draft occurring with certain types of implements, it is necessary in ordinary practice to connect the implement to one side or the other of the center line of the tractor. With my improved floating hitch this adjustment may be readily and quickly made by shifting the hitch bar to the desired position on the brace member so that the bight portion of the hitch bar will be alined with the desired center of pull. Further, either end of the hitch bar may be swung about either of the fasteners 17 so as to increase or decrease the effective working angle of the hitch.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. A hitch of the character described, comprising a supporting member having spaced alined openings therethrough, a hitch bar of substantially V-form having each of its free ends provided with a curved series of alined openings, means passing through the openings in the supporting member and hitch bar to secure the same together, said hitch bar being circular in cross-section and of substantially uniform diameter throughout the greater portion of its length, and a roller connecting member mounted on said hitch bar for free and unobstructed movement throughout the greater portion of the length of the latter.

2. A hitch of the character described in accordance with claim 1, wherein one of the arms of the hitch bar is longer than the other, whereby to provide for variations in the adjustments of the bar upon reversal of the latter.

EDWARD P. HOEPFNER.